United States Patent [19]

Olson et al.

[11] 4,143,670

[45] Mar. 13, 1979

[54] DUCTING FIRE PROTECTION

[75] Inventors: Rodney I. Olson, Los Angeles; Nicholas J. Szegedi, La Canada, both of Calif.

[73] Assignee: Fiber-Dyne, Inc., Sun Valley, Calif.

[21] Appl. No.: 749,686

[22] Filed: Dec. 13, 1976

[51] Int. Cl.[2] ............................................. F16K 17/38
[52] U.S. Cl. ........................................ 137/72; 169/56
[58] Field of Search .................... 251/4, 6–9; 137/67, 72–77, 457, 842, 843, 844, 853, 517; 169/56

[56] References Cited

U.S. PATENT DOCUMENTS

| 34,419 | 2/1862 | Fuller | 251/8 |
|---|---|---|---|
| 1,699,244 | 1/1929 | Lewis | 169/57 |
| 2,661,764 | 12/1953 | Johnson et al. | 137/517 |
| 2,843,153 | 7/1958 | Young | 285/423 X |
| 3,156,263 | 11/1964 | Adelman | 251/4 X |
| 3,496,022 | 2/1970 | Lit | 137/72 X |
| 3,504,615 | 4/1970 | Kurz | 98/1 |
| 3,570,384 | 3/1971 | McLeod | 98/1 |
| 3,586,040 | 6/1971 | Urback | 137/844 |
| 3,592,207 | 7/1971 | Borello | 137/1 |
| 3,720,153 | 3/1973 | Jardinier et al. | 98/86 |
| 3,726,050 | 4/1973 | Wise et al. | 137/75 X |
| 3,756,137 | 9/1973 | Scharres | 98/1 |
| 3,835,875 | 9/1974 | Morse | 137/75 |
| 3,921,657 | 11/1975 | Bergmark et al. | 137/75 |

FOREIGN PATENT DOCUMENTS

| 229903 | 7/1959 | Australia | 285/235 |
|---|---|---|---|
| 1806660 | 5/1970 | Fed. Rep. of Germany | 169/56 |
| 502094 | 3/1939 | United Kingdom | 251/7 |

*Primary Examiner*—Martin P. Schwadron
*Assistant Examiner*—Richard Gerard
*Attorney, Agent, or Firm*—Harris, Kern, Wallen & Tinsley

[57] ABSTRACT

A length of fiberglass duct with a thermoplastic sleeve positioned within the duct as a liner, with the sleeve fixed to the duct at the downstream end of the sleeve. Flames or high temperature fluids moving through the duct soften the thermoplastic sleeve and cause the sleeve to collapse blocking further movement through the duct.

3 Claims, 2 Drawing Figures

DUCTING FIRE PROTECTION

BACKGROUND OF THE INVENTION

This invention relates to ducting and in particular to a fire protection system particularly suited for ducts made of fiberglass and other high temperature corrosion resistant plastic.

Ducting is widely used for exhausting gases and vapors in many industrial and commercial installations. The ducting passes through walls and other fire stops and presents a problem with fire control since flames and high temperature fluids can move through ducting causing undesirable spread of fire, smoke, fumes and the like.

A substantial amount of ducting in use is formed of metal and a wide variety of fire protection devices are available for metal ducting. Typically a temperature detector of some nature is positioned in the pipe and when the temperature in the pipe rises to a predetermined value, a damper is closed, blocking movement of flame through the pipe. A counter weighted damper may be held in the up or open position by a fusible link which when melted, permits movement of the damper.

However many ducting installations are required to handle highly corrosive vapors and the metal duct is not satisfactory. Fiberglass duct is extensively used today to meet the requirement of high temperature corrosion resistance and the damper type fire protection systems are not suitable for use therewith. One approach to the problem has been to install sprinkler heads within the fiberglass ducts, with the sprinklers controlled by temperature sensors. This is an expensive type of installation and has not been entirely satisfactory. As used herein, fiberglass is intended to include those plastic materials having high temperature corrosion resistance and used in the manufacture of ducting.

In one approach to this problem, a thermoplastic sleeve is used as a splice between two lengths of duct. When flames or high temperature fluids pass through the duct, the sleeve is softened and collapses, blocking flow through the duct and permitting entry of outside air. However this system has some disadvantages, including the fact that the integrity of the fiberglass duct is compromised and that the direct exposure of the plastic sleeve to the ambient atmosphere tends to make the softening temperature of the sleeve less certain.

It is an object of the present invention to provide a new and improved fire protection system for use with high temperature corrosion resistant ducts, which system does not utilize any metal components so that the corrosive fluid handling capabilities of the duct is not adversely affected and which does not require any breaks in the duct. A further object is to provide such a fire protection system which is simple, easy to install, and relatively inexpensive.

SUMMARY OF THE INVENTION

A thermoplastic sleeve is disposed within a fiberglass duct as a liner, with the sleeve fixed to the duct at the downstream end of the sleeve. When flames or high temperature fluids pass through the duct, the sleeve is softened and collapses, with the force of gravity and the force of the moving fluid aiding the collapse. The collapsed sleeve blocks flow in the duct and prevents movement of the flame along the duct. Various thermoplastic materials can be used, depending upon the temperature at which the system is to become operable.

DESCRIPTION OF THE PREFERRED EMBODIMENT

Figure 1:
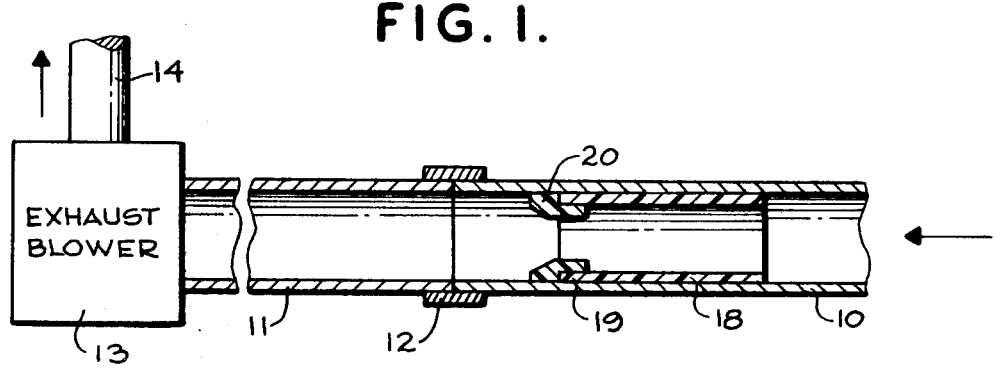
FIG. 1 is a view partly in section illustrating a fire protection system incorporating the presently preferred embodiment of the invention.

FIG. 1 illustrates a piece of fiberglass duct 10 joined to another piece of fiberglass duct 11 by a conventional joint 12. The duct 11 provides an input to a blower 13 with an outlet duct 14. This is a typical installation of fiberglass ducting for moving corrosive vapors.

A thermoplastic sleeve 18 is positioned within the duct 10, snugly fitting the inner wall of the duct as a liner. The downstream end 19 of the sleeve is fixed to the duct 10, typically by a length of fiberglass 20 impregnated with an appropriate resin for bonding to the material of the duct and the material of the sleeve.

In a typical installation, the fiberglass duct may be in the order of one foot to three feet in diameter and the thermoplastic sleeve may be in the order of four feet to eight feet in length. Of course the invention is not limited to these particular dimensions and smaller or larger dimensions may be utilized. The sleeve is formed of a thermoplastic which remains stiff at the normal operating temperature, while softening but not melting or vaporizing at the higher temperature produced by flame. A presently preferred material is rigid polyvinyl chloride, with a 1/16 inch wall thickness for smaller diameters and a ⅛ inch wall thickness for larger diameters, such as 1/16 inch for a one foot diameter sleeve and ⅛ inch for a two foot diameter sleeve and larger. Other thermoplastic materials which may be used for the sleeve are acrylonitrile-butadiene-styrene, rubber modified styrene, polyvinyl dichloride, polyproplyene, polyethylene, cellulose acetate butyrate, polyacepal, and Teflon.

Figure 2:
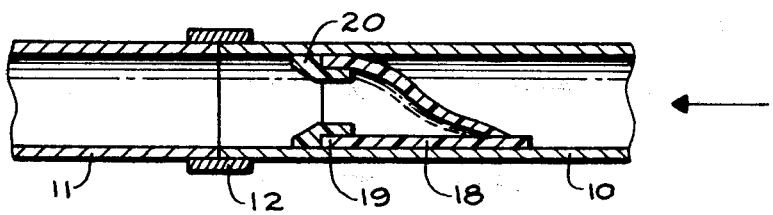
FIG. 2 is a view of a portion of FIG. 1 showing the sleeve in the collapsed position.

In operation, the vapor or gas or other fluid is moved through the duct from right to left as viewed in FIG. 1. If for any reason there is a flame in the duct or a fluid with very high temperature, the plastic sleeve will soften and collapse under the influence of gravity and the force produced by the moving fluid, to the position shown in FIG. 2. The collapsed sleeve serves to block flow through the duct, thereby preventing the exhaust blower from sucking the flame through the ducting system. It will be understood that the temperature at which the sleeve softens and collapses can be varied by utilizing various materials for the thermoplastic sleeve.

We claim:

1. A fire protection system for horizontally disposed ducting comprising:
    a length of fiberglass duct of uniform diameter and having a continuous inner wall and having a flow path therethrough from an inlet to an outlet; and
    a thermoplastic sleeve of uniform diameter and having a continuous wall and positioned entirely within said duct resting against said continuous inner wall of said duct as a liner coaxial with said duct in self-supporting relation, with the end of said sleeve closest to said outlet affixed to said duct and with said sleeve maintaining its position in contact with said duct inner wall prior to heat softening without any sleeve internal support other than that which affixes said sleeve outlet end to said duct;

said sleeve being of a material characterized by having a softening temperature substantially lower than the softening temperature of said fiberglass duct whereby flow from said inlet to said outlet automatically effects permanent collapse of said sleeve onto itself into the flow path of said duct when said sleeve is heated to its softening temperature by flame or fluid flow in said duct, with said sleeve being of sufficient length to block flow through said duct upon collapse of said sleeve.

2. A fire protection system as defined in claim 1 wherein said thermoplastic sleeve is rigid polyvinyl chloride.

3. A fire protection system as defined in claim 1 wherein said sleeve is bonded to said duct by a resin impregnated length of fiberglass overlying said sleeve and duct.

* * * * *